United States Patent [19]

Bender

[11] Patent Number: 5,593,325

[45] Date of Patent: Jan. 14, 1997

[54] LOW-VOLTAGE SWITCHING APPARATUS

[75] Inventor: Werner Bender, Ostfildern, Germany

[73] Assignee: Pilz GmbH & Co., Germany

[21] Appl. No.: 371,020

[22] Filed: Jan. 11, 1995

[30] Foreign Application Priority Data

Jan. 11, 1994 [DE] Germany ............... 44 00 484.2

[51] Int. Cl.⁶ ............................................. H01R 9/22
[52] U.S. Cl. ......................................................... 439/709
[58] Field of Search ................................ 439/709, 721, 439/723, 718, 801

[56] References Cited

U.S. PATENT DOCUMENTS

| | | | |
|---|---|---|---|
| 2,610,996 | 9/1952 | Rickabaugh | 439/721 |
| 4,180,305 | 12/1979 | Ustin et al. | 439/718 |
| 4,251,853 | 2/1981 | Sites . | |
| 5,403,204 | 4/1995 | Chishima et al. | 439/723 |
| 5,427,550 | 6/1995 | Jaag | 439/709 |

FOREIGN PATENT DOCUMENTS

| | | |
|---|---|---|
| 2511385C3 | 3/1978 | Germany . |
| 2910619A1 | 9/1980 | Germany . |
| 2732963C2 | 10/1982 | Germany . |
| 3411028A1 | 9/1985 | Germany . |
| 8901602U1 | 5/1989 | Germany . |
| 4033969A1 | 4/1992 | Germany . |

Primary Examiner—P. Austin Bradley
Assistant Examiner—Yong Kim
Attorney, Agent, or Firm—Leydig, Voit & Mayer, Ltd.

[57] ABSTRACT

A low-voltage switching apparatus that houses an electric circuit is provided with a housing subdivided into two parts, in the interior of which conductor plates are arranged. The conductor plates carry screw terminals which are directly connected with the conductor plates. The screw terminals have terminal openings which stand perpendicular to the conductor plates which are arranged parallel to a connection side of the housing. The terminal openings are accessible through connection openings provided in the connection side. Accordingly, several conductor plates can be accommodated parallel to one another in the housing and the screw terminals can be arranged directly on the conductor plates.

25 Claims, 4 Drawing Sheets

LOW-VOLTAGE SWITCHING APPARATUS

BACKGROUND OF THE INVENTION

In today's practice, low-voltage switching apparatuses are known which have a housing arranged for fastening in switching boxes, the housing receiving an electric circuit. For the connecting of this electric circuit to an exterior of the housing wiring system, screw terminals are provided which are accessible via corresponding openings provided in the housing. For the electric connection between the circuit (typically carried on a conductor plate) and the screw terminals, a wiring or cabling is provided in the housing.

The separate arrangement of the screw terminals and of the conductor plate in the housing requires non-negligible manufacturing expenditure in the production of the switching apparatus.

Proceeding from this, it is the primary object of the invention to create a low-voltage switching apparatus which can be produced with low expenditure in an automated production system.

SUMMARY OF THE INVENTION

This object is realized by a low-voltage switching apparatus according to the invention.

The low-voltage switching apparatus has a housing including connection sides arranged in spaced parallel relation to one another. These connection sides are accessible for the cabling or wiring to be connected to the switching apparatus, particularly when several such switching apparatuses are mounted in a row with their side surfaces contacting each other. The operating surface of the switching apparatus remains accessible because all cables are to be connected exclusively on the outsides and, therefore, no cable covers the operating surface. The connecting or wiring of the low-voltage switching apparatus takes place with the aid of screw terminals provided in the interior. These are easy to actuate with a screwdriver and require no special tools. The terminal screws provided in the screw terminals are all accessible through openings lying in the operating surface, so that these can easily be actuated even in the case of a very large number of wires to be connected. The wires to be connected are inserted through connection openings and into terminal openings of the screw terminals, after which the terminal screw is suitably tightened to secure the wire within the screw terminal. The access openings to the terminal screws allow this actuation.

According to this arrangement, all the connection openings are provided in the connection sides—i.e. away from the operating surface. The screw terminals arranged in the housing are soldered to at least one conductor plate which carries the electric circuit executing a certain function. The screw terminals include soldering lugs which are inserted through corresponding conductor-plate bores and soldered to the conductor plate. Because the soldering lugs of the screw terminals are aligned parallel to the connection openings, the terminal openings lie parallel to the conductor plate once the screw terminals are soldered to the conductor plate. This type of fastening of the soldering lugs to the conductor plate is not only simple but ensures, moreover, that mechanical forces on the screw terminals are absorbed by the conductor plate bore and thus kept away from the conductor path, to prevent damage thereto. Furthermore this arrangement of the screw terminals on the conductor plate ensures that the conductor plate is arranged surface-parallel to the connection side, while the wire to be connected is inserted through the connection opening provided in the same connection side and, therefore, is secured standing at a right angle to the conductor plates. The arrangement thus made possible of the conductor plates in the interior space yields a good space utilization and creates an advantageous interior construction of the low-voltage switching apparatus. Moreover, the screw terminals are to be fastened to the conductor plate with a simple soldering operation, which eliminates the need for relatively complicated wiring operations.

In order to also make it possible to fasten heavy components to the conductor plates, or to protect the low-voltage switching apparatus against jarring and vibrations, it is advantageous if the conductor plate is supported in the housing in fixed position by a holding arrangement. This holding arrangement can be formed, for example, by first flanges that are arranged on the side surfaces in the interior and between which the conductor plate is slidable.

On the conductor plate several screw terminals can be arranged adjacently in a row, so that whole terminal blocks are formed.

The outfitting of the conductor plate is facilitated if several screw terminals are combined into one screw terminal unit. This can consist of an electrically insulating molded body, which thus receives and holds several screw terminals electrically insulated from one another. The screw terminals lying in a row are arranged parallel to one another, so that their terminal openings and terminal screws face in each case in the same direction.

In order to protect the conductor plate and its wiring against mechanical damage also in the case of strong tensioning of the terminal screws, the molded body of the screw terminal unit can be provided with arrangements for the fixing in position in the housing. There it suffices if these arrangements are grooves, into which there engage corresponding second flanges provided on the housing. These grooves can be arranged parallel to the conductor plate, which opens up the possibility of executing the housing in two parts in such manner that it has a bottom part which receives the conductor plates and a cap part which essentially receives the screw terminals. The separating joint formed between the bottom part and the cap part thus separates the side parts and the connection sides.

Although it is possible for the screw terminals arranged in the interior and soldered to the conductor plate also to be arranged offset in height, it is advantageous if they are arranged on a straight line parallel to the connection side and to the operating side. Correspondingly, also the openings serving for the actuation of the terminal screws and the connection openings allocated to the terminal openings are arranged in each case on a line.

To increase the number of screw terminals to be accommodated in a housing and therewith the number of electric connections that can be established to the outside, the housing can be stepped between the operating side and the connection side, so that in connection to the operating side at least one step stage is formed. In this case there can be arranged in the interior of the housing on two conductor plates two rows of the screw terminals which are offset in their height against one another. The screw terminals lying further inward, i.e. toward the center of the housing, are there arranged higher, so that their terminal openings are disposed above the terminal screws of the outward-lying screw terminals. Accordingly, both rows of screw terminals can be easily connected.

For the further increase of the number of terminal places formed by screw terminals, the housing can also be staged multiply stepwise.

BRIEF DESCRIPTION OF THE DRAWINGS

In the drawings there are represented an example of execution of the invention.

DETAILED DESCRIPTION OF THE PREFERRED EMBODIMENT

While this invention will be described with reference to the preferred embodiment, it will be obvious to those skilled in the art that variations of the preferred embodiment may be used and it is intended that the invention may be practiced otherwise than as specifically described herein. Accordingly, this invention includes all modifications encompassed within the spirit and scope of the invention as defined by the appended claims.

Figure 1:
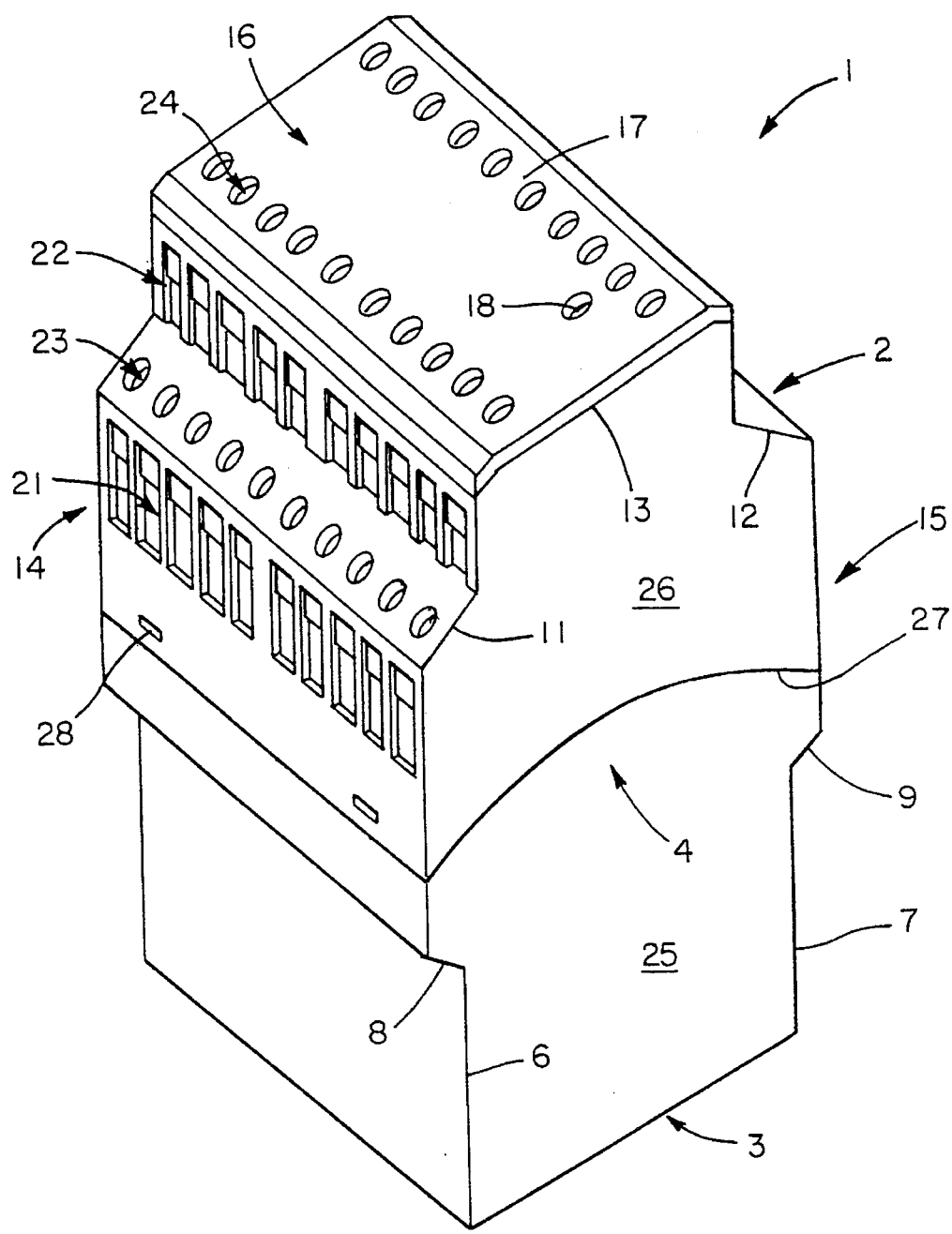
FIG. 1 shows a low-voltage switching apparatus represented in perspective.

In FIG. 1 there is represented a low-voltage switching apparatus 1 which has an electrically insulating casing 2 composed of an impact-tough plastic material. The housing 2 is approximately of building-block form and has a rectangular rear side 3 on which there are provided means not further represented for fastening to a mounting rail. At a right angle to the rear side 3 are attached two pane-constructed side surfaces 4, 5, which are spaced parallel to one another and which have the same contour.

The contour of the side surfaces 4, 5 is determined, proceeding from the back side 3, by two parallel-running edges 6, 7 of equal length, which bend outward with short sections 8, 9, in order then again to run parallel to one another with increased spacing. Following thereupon, the edges 6, 7 with short intervals 11, 12 running parallel to the base 3, go over into further sections which run with a spacing that is less than the width of the back 3. The edges then run parallel to one another up to a close-off edge 13, which lies parallel to the back side 3.

The two side surfaces 4, 5 are joined by connecting sides 14, 15, which are constructed section-wise plane and follow the contour of the side surfaces 4, 5. The short intervals 11, 12 on the side section thus lie at either end of step stages in the connecting sides 14, 15.

The side surfaces 4, 5 and the close-off sides 14, 15 bound an opening which is closed with a flat-constructed cover 16, rectangular in contour. Because the cover 16, when completely connected in low-voltage switching apparatus 1, is the sole remaining surface substantially freely accessible, it presents simultaneously an operating surface 17, on which operating elements and/or indicating elements can be arranged. In FIG. 1 there is provided for this purpose only an opening 18, in which, for example, a luminous diode can be arranged. In the embodiment shown, the step stage formed in connecting sides 14, 15 is substantially parallel to the operating surface.

The cover 16 is fastened to the rest of the housing 2 with a snap-in connection which maintains it in such a way that it cannot be inadvertently released.

The connection sides 14, 15, include a section constructed in the manner of terraces or steps, in which there are provided connection openings 21, 22, through which the wires of a wiring system, not further represented, are insertable into the housing 2. The connection openings 21, 22 lie on a straight line that is arranged parallel both to the back 3 and also to the operating side 17.

To each row of connection openings 21, 22 there is assigned a row of openings 23, 24, which stand at a right angle to the connection openings 21, 22. One row (24) of openings is formed in the operating side 17, while the other row (23) is formed in the step stage of connection side 14. The openings 23, 24, too, lie on straight lines which are parallel in each case to the connection sides 14, 15.

Figure 2:
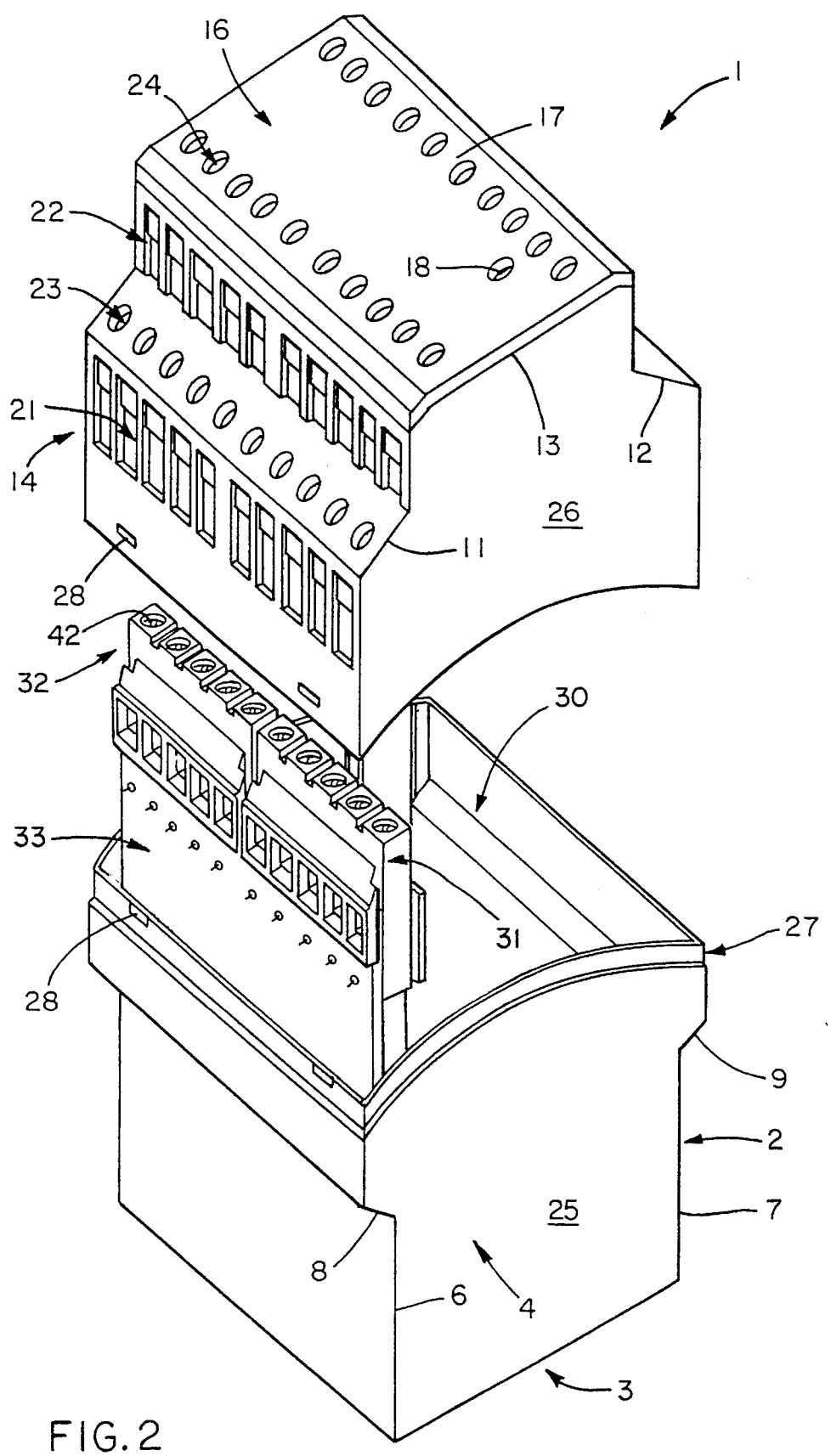
FIG. 2 the low-voltage switching apparatus according to FIG. 1 in exploded representation, FIG. 3 the housing of the low-voltage switching apparatus according to FIG. 1 in exploded representation, FIG. 4 a conductor plate for the low-voltage switching apparatus according to FIG. 1 outfitted with a screw terminal block, in perspective, and FIG. 5 the screw terminal block according to FIG. 4.

To the connection openings 21, 22 and openings 23, 24, as is seen especially from FIG. 2, there are assigned screw terminal blocks 31, 32, which are arranged in an interior space 30 surrounded by the housing 2. The screw terminal blocks 31, 32 are soldered together with a conductor plate 33, which is inserted into a bottom section 25 of the housing 2.

The housing 2 is divided into the bottom section 25 and a cap part 26, in which there are provided all the connection openings 21, 22 as well as openings 23, 24. The casing 2, accordingly is divided into two at a separating joint 27, in which a snap connection arrangement 28 is provided for the joining of the bottom part 25 with the cap part 26.

In the housing 2, represented open in FIG. 2, there are arranged altogether four conductor plates outfitted with screw terminal blocks, of which, in the interest of simplicity, however, only the conductor plate 33 is presented. All the conductor plates are received in the bottom part 25, and bear screw terminal blocks. Further, all the conductor plates are aligned parallel to the connection sides 14, 15. The outside-lying conductor plates 33 are dimensioned in their length so that the associated screw terminal blocks 31, 32 are accessible through the connection openings 21 and openings 23, respectively. The inside-lying conductor plates (not represented) are correspondingly longer and are arranged in such a manner that the screw terminal blocks soldered on them are accessible through the connection openings 22 and openings 24. Correspondingly, there are aligned the conductor plates of the connection side 15, not visible in the figures.

Figure 3:
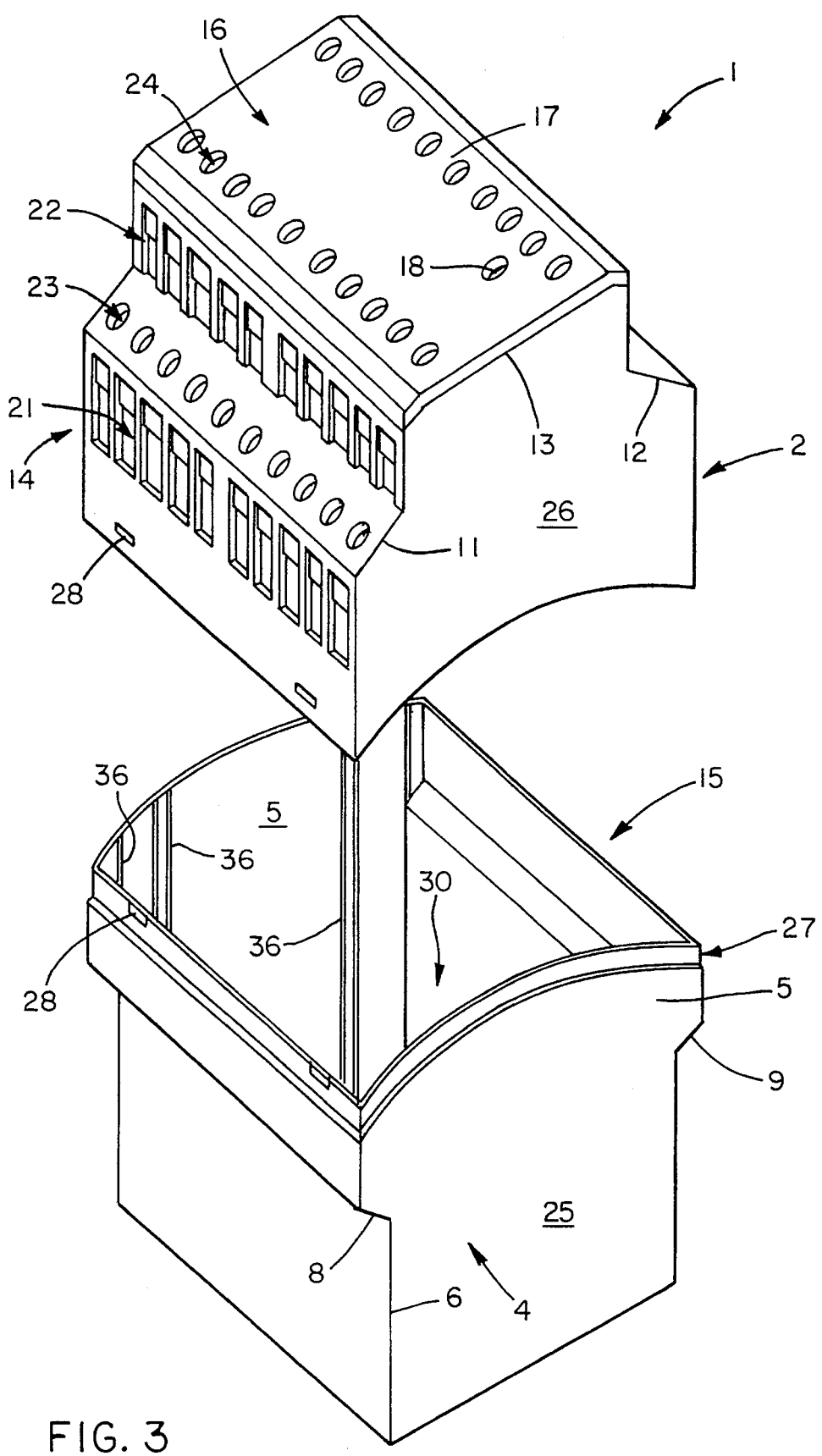

The housing 2 separately represented in FIG. 3 is provided in its interior space 30 with first flanges 36, which run at a distance of 1.5 to 2 mm parallel to one another and parallel to the connection sides 14, 15. The first flanges 36 extending along the side surfaces 4, 5 serve for the guidance and support of the conductor plate 33 represented in FIG. 2 and of the other unrepresented conductor plates. The first flanges 36 run on into the zone of the cap 26.

Figure 4:
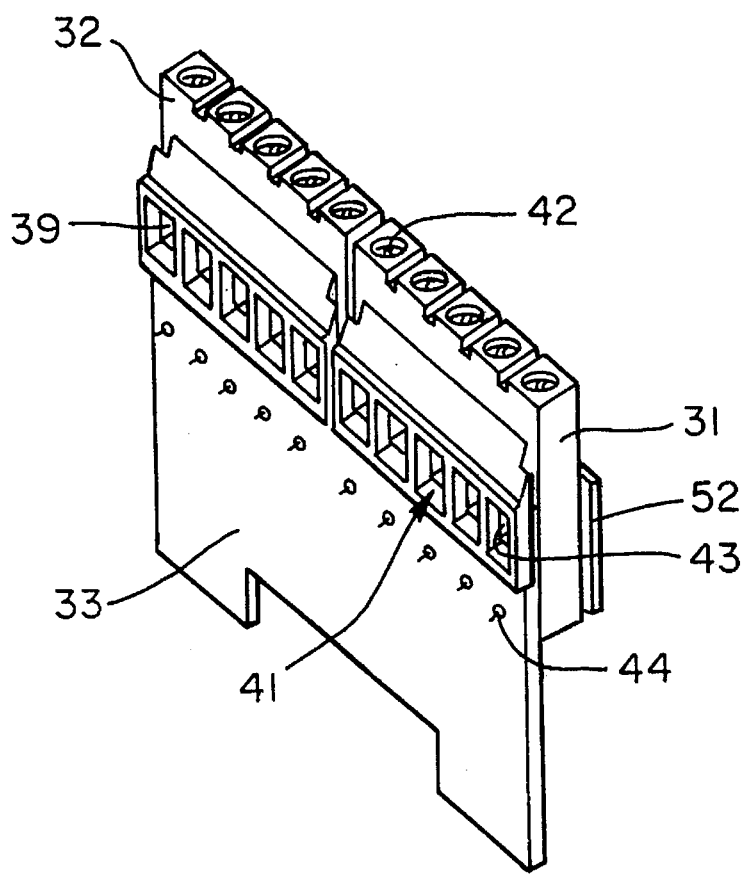

By way of example for all the conductor plates provided with screw terminal blocks, in FIG. 4 the conductor plate 33 is separately represented. On the conductor plate 33 there are employed the screw terminal blocks 31, 32. The screw terminal blocks 31, 32 constructed alike among one another, so that in the following, reference will be made exclusively to the screw terminal block 31.

The screw terminal block 31 (FIG. 5) has a molded body 38 produced from an impact-tough electrically insulating plastic material, in which there are received five screw terminals 39, electrically insulated from one another. The molded bodies 38 can also be directly constructed with six or more screw terminals 39, in which case correspondingly more connection openings 21, 22 are to be formed in the cap part 26.

Each screw terminal 39 has a metal body 41 (FIG. 5) held in closed linkage in the molded body 38, which has a terminal opening 43 narrowing over a terminal screw 42.

To each terminal opening 43 there is assigned a corresponding rectangular opening in the molded body 38, which narrows inward in funnel form onto the terminal opening 43. The size of the rectangular openings in the molded body 38 is the same as the connection openings 21, 22 provided in the cap 26. These are kept relatively large; at any rate noticeably larger than the terminal openings 43 in the metal body 41. The threading of wires into the terminal openings 43 is thus facilitated, for, proceeding from the relatively large connection openings 21, 22, a wire inserted into these, in consequence of the funnel-shaped narrowing, is introduced without problems into the terminal opening 43.

Figure 5:
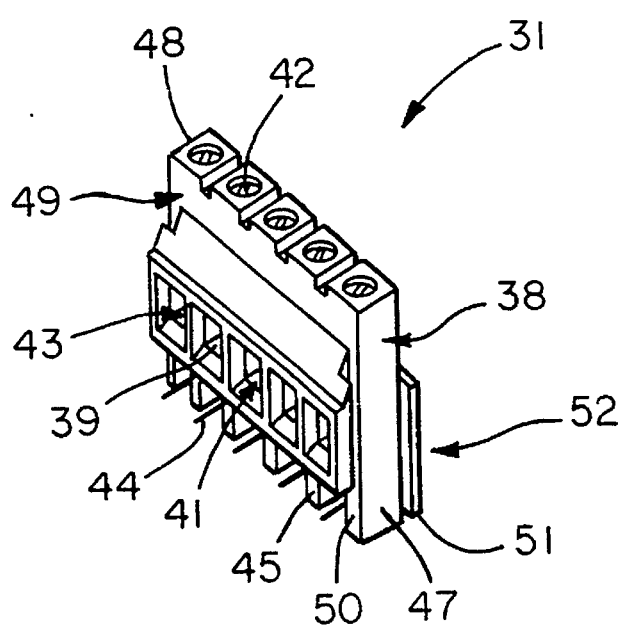

Each screw terminal 39 held in the molded body 38 has in each case a soldering lug 44 which extends parallel to the respective terminal opening 43 provided in the metal body 41. The soldering lug 44 is formed as a metal strip, rectangular in cross section and, by reason of the choice of its material, bending-rigid. The cross section of the soldering lugs 44, especially to be seen from FIG. 5, is such that such a soldering lug fits without problems through the conductor plate bore (FIG. 4) measuring at least 1.5 mm in diameter. The soldering eyes, not further represented in FIG. 4, and soldering lugs 44 of connecting conductor paths present, in the first place, the electrical connection to the respective screw terminal 39 and, in the second place, hold the screw terminal block 31 firmly on the conductor plate 33. The conductor plate 33 lies with surface contact on a support surface 45 interrupted by the soldering lugs 44, which is formed on the molded body 38 underneath the terminal openings 43. The support surface 45 lies there in a depression, so it is set back parallel to the mouth of the terminal openings 43. Thereby the mouths of the terminal openings 43 lie snugly on the insides of the connection openings 21, 22, while the conductor plate 33 still stands at a certain distance from the connection side 14.

On both sides 47, 48 standing at a right angle to the conductor plate 33, of the molded body 38 there are provided altogether four holding grooves 49, 50, 51, the fourth of which is covered in FIGS. 4 and 5 and is, therefore, invisible. The holding grooves 49, 50, 51 lie parallel to the conductor plate 33, to be connected with screw terminal block 31, and have a cross section of approximately one square millimeter. The holding grooves 49, 50 extend in direct extension of the support surface 45 along the sides 47, 48 through the projection of the molded body 38 bounding the terminal openings. For the formation of the holding groove 51 and of the holding groove covered in FIG. 5, the molded body 38 has on its back side additions 52 which are joined in one piece with the molded body 38.

To the holding grooves 49, 50, 51, there are allocated second flanges provided in the cap 26, which engage into the holding grooves 49, 50, 51 when the molded body 38 is thrust into its intended position. When this occurs the terminal openings 43 align with the connection openings 21, 22 and the terminal screws 42 stand under the openings 23, 24.

By reason of the parallelism of the holding groove(s) 49, 50, 51 to the conductor plate 33, the housing 2 outfitted with conductor plates can be assembled in a single linear movement, in which both the conductor plates and also the screw terminals 31, 32 are received within their respective flanges.

What is claimed is:

1. a low-voltage switching apparatus for connecting wires to an electrical circuit disposed within the switching apparatus, comprising in combination:

(a) a two-part housing enclosing an interior space, the two-part housing including a back side, two side surfaces lying parallel and spaced from one another, and first and second connection sides lying parallel and spaced from one another and disposed at a right angle to the side surfaces, the two-part housing including an operating surface;

(b) a conductor plate held in a fixed position within the two-part housing by a holding arrangement and arranged substantially parallel to the first connection side;

(c) an electrically insulating molded body having a support surface lying against the conductor plate;

(d) at least one screw terminal arranged in the electrically insulating molded body, each screw terminal having a terminal opening, a terminal screw standing at a right angle to the terminal opening, and a soldering lug arranged parallel to the terminal opening and soldered to the conductor plate;

(e) the two-part housing including connection openings on at least the first connection side, the connection openings providing access to terminal openings of the screw terminals from outside the two-part housing, and (f) the two-part housing further including access openings on the operating surface, the access openings providing access to terminal screws of the screw terminals to allow actuation of the terminal screw.

2. Low-voltage switching apparatus according to claim 1, wherein first flanges are arranged in the interior space on the side surfaces between which the conductor plate is slidable to hold the conductor plate in a fixed position in the two-part housing.

3. Low-voltage switching apparatus according to claim 1, wherein the screw terminals are arranged next to one another in a row on the conductor plate.

4. Low-voltage switching apparatus according to claim 1, wherein the screw terminals are connected into a screw terminal unit.

5. Low-voltage switching apparatus according to claim 1, wherein the screw terminals lie parallel to one another in a row.

6. Low-voltage switching apparatus according to claim 1, wherein the electrically insulating molded body has grooves for fastening the electrically insulating molded body in fixed position in the two-part housing.

7. Low-voltage switching apparatus according to claim 6, wherein the grooves are arranged parallel to the conductor plate.

8. Low-voltage switching apparatus according to claim 7, wherein the grooves are arranged laterally on the electrically insulating molded body and lie in planes parallel to the conductor plate.

9. Low-voltage switching apparatus according to claim 1, wherein the two-part housing includes second flanges arranged in a cap part of the two-part housing for supporting the electrically insulating molded bodies in a fixed position.

10. Low-voltage switching apparatus according to claim 9, wherein the second flanges are formed in one piece with the cap part.

11. Low-voltage switching apparatus according to claim 2, wherein the first flanges are formed parallel to the connection sides.

12. Low-voltage switching apparatus according to claim 1, wherein the connection openings of the two-part housing are arranged on at least one straight line.

13. Low-voltage switching apparatus according to claim 12, wherein the access openings provided in the operating surface lie on a line extending parallel to the connection side.

14. Low-voltage switching apparatus according to claim 1, wherein the connection sides have a stepped profile and include at least one step stage.

15. Low-voltage switching apparatus according to claim 14, wherein connection openings are arranged in a section of the first connection side lying between the step stage and the back side.

16. Low-voltage switching apparatus according to claim 14, wherein connection openings are arranged in a part of the first connection side between the step stage and the operating surface.

17. Low-voltage switching apparatus according to claim 16, wherein the part of the first connection side lying between the step stage and the operating surface is parallel to the rest of the first connection side.

18. Low-voltage switching apparatus according to claim 14, wherein the step stage includes access openings for the actuation of corresponding terminal screws.

19. Low-voltage switching apparatus according to claim 1, wherein the first and second connection sides have a stepped profile and include a plurality of step stages.

20. Low-voltage switching apparatus according to claim 1, the first and second connection sides include several step stages substantially parallel to the operating surface, the sections of the first and second connection sides between the step stages being substantially parallel to the remainder of the connection sides.

21. Low-voltage switching apparatus according to claim 20, wherein connection openings are disposed in the section of the connection side between the step stages and between the step stages and the back side and between the step stages and the operating surface; and access openings for the actuation of the terminal screws are disposed in the step stages.

22. Low-voltage switching apparatus according to claim 1, wherein the two-part housing include a cap part and a bottom part, and the connection openings and access openings are disposed in the cap part.

23. Low-voltage switching apparatus according to claim 1, wherein the electrically insulating molded body has means for fastening the electrically insulating molded body in a fixed position in the two-part housing.

24. Low-voltage switching apparatus according to claim 1, wherein the two-part housing has means for supporting the electrically insulating molded body in a fixed position in the two-part housing.

25. Low-voltage switching apparatus according to claim 1, wherein the two-part housing has means for supporting the conductor plate in a fixed position in the two-part housing.

* * * * *